(12) United States Patent
Ikuta et al.

(10) Patent No.: US 9,835,843 B2
(45) Date of Patent: Dec. 5, 2017

(54) THREE-DIMENSIONAL CONFOCAL MICROSCOPY APPARATUS AND FOCAL PLANE SCANNING AND ABERRATION CORRECTION UNIT

(75) Inventors: Koji Ikuta, Nagoya (JP); Masashi Ikeuchi, Yokohama (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 683 days.

(21) Appl. No.: 13/823,297

(22) PCT Filed: Jul. 27, 2011

(86) PCT No.: PCT/JP2011/067719
§ 371 (c)(1),
(2), (4) Date: Mar. 26, 2013

(87) PCT Pub. No.: WO2012/035903
PCT Pub. Date: Mar. 22, 2012

(65) Prior Publication Data
US 2013/0229493 A1 Sep. 5, 2013

(30) Foreign Application Priority Data
Sep. 17, 2010 (JP) .................. 2010-208971

(51) Int. Cl.
*G02B 21/36* (2006.01)
*G02B 21/32* (2006.01)
(Continued)

(52) U.S. Cl.
CPC ......... *G02B 21/367* (2013.01); *G02B 21/006* (2013.01); *G02B 21/0076* (2013.01);
(Continued)

(58) Field of Classification Search
CPC .... G02B 21/367; G02B 21/32; G02B 21/365; G02B 21/0076; G02B 21/006
(Continued)

(56) References Cited

U.S. PATENT DOCUMENTS

| 6,088,097 A * | 7/2000 | Uhl ................. G02B 21/0036 250/458.1 |
| 2003/0103263 A1* | 6/2003 | Engelhardt ............ G02B 21/02 359/380 |

(Continued)

FOREIGN PATENT DOCUMENTS

| DE | 10 2004 034 992 A1 | 2/2006 |
| EP | 1 855 141 A1 | 11/2007 |

(Continued)

OTHER PUBLICATIONS

European Patent Office, Extended European Search Report, Application No. EP 11 82 4911, dated Apr. 20, 2015.
(Continued)

*Primary Examiner* — Tung Vo
*Assistant Examiner* — Zaihan Jiang
(74) *Attorney, Agent, or Firm* — Amster, Rothstein & Ebenstein LLP

(57) ABSTRACT

Provided is a 3-dimensional confocal microscopy apparatus which is manufactured by combining a confocal microscope and an optical tweezers technique, wherein a pair of lenses for focal plane displacement where one lens is movable in the optical axis direction is arranged between a fixed objective lens and a fluorescent light imaging camera, and the 3-dimensional confocal microscopy apparatus also includes a mean which corrects the aberration of a fluorescent confocal image obtained by the fluorescent imaging camera. Accordingly, it is possible to provide a 3-dimensional confocal microscopy apparatus which can acquire a 3-dimen- (Continued)

sional image of a specimen during a manipulation of the specimen using optical tweezers without affecting an optical trap.

10 Claims, 8 Drawing Sheets

(51) Int. Cl.
    *G02B 21/00*     (2006.01)
    *B33Y 80/00*     (2015.01)

(52) U.S. Cl.
    CPC ........... *G02B 21/32* (2013.01); *G02B 21/365* (2013.01); *B33Y 80/00* (2014.12)

(58) Field of Classification Search
    USPC .......................................................... 348/46
    See application file for complete search history.

(56) References Cited

U.S. PATENT DOCUMENTS

| | | | | |
|---|---|---|---|---|
| 2004/0125370 | A1* | 7/2004 | Montagu | G01N 21/0303 356/244 |
| 2006/0147176 | A1* | 7/2006 | Takamatsu | G02B 21/14 385/147 |
| 2006/0184042 | A1* | 8/2006 | Wang | A61B 5/0073 600/476 |
| 2008/0186551 | A1* | 8/2008 | Hanft | A61F 9/0084 359/205.1 |
| 2010/0079580 | A1* | 4/2010 | Waring, IV | H04N 13/0011 348/44 |
| 2012/0224034 | A1* | 9/2012 | Kalkbrenner | G01N 21/6458 348/49 |

FOREIGN PATENT DOCUMENTS

| | | |
|---|---|---|
| JP | H08-234110 A | 9/1996 |
| JP | 2005337730 | 12/2005 |
| JP | 2007286310 | 11/2007 |
| JP | 2007304339 | 11/2007 |
| JP | 2009-210889 A | 9/2009 |
| JP | 2009-294008 A | 12/2009 |
| JP | 2010-160371 A | 7/2010 |
| JP | 2010-164635 A | 7/2010 |

OTHER PUBLICATIONS

International Preliminary Report on Patentability, dated Apr. 16, 2013.

* cited by examiner

THREE-DIMENSIONAL CONFOCAL MICROSCOPY APPARATUS AND FOCAL PLANE SCANNING AND ABERRATION CORRECTION UNIT

CROSS-REFERENCE TO RELATED APPLICATIONS

This application is a U.S. national stage entry under 35 U.S.C. §371 of PCT International Application No. PCT/JP2011/067719, filed on Jul. 27, 2011, and claims priority to Japanese Application No. JP 2010-208971, filed on Sep. 17, 2010, the contents of which are incorporated herein by reference in their entirety.

TECHNICAL FIELD

The present invention relates to a 3-dimensional confocal microscopy apparatus and a focal plane scanning and aberration correction unit. The present invention more particularly relates to a 3-dimensional confocal imaging apparatus which is manufactured by combining a so-called confocal microscope and an optical tweezers technique and can cope with problems which newly arise as the result of such combination, and a focal plane scanning and aberration correction unit which constitutes an essential part of the novel constitution of the apparatus.

BACKGROUND ART

In the field of biology or the like, conventionally, as described in the following patent literature 1, for example, there has been used a technique referred to as optical tweezers where a transparent micro bead is put into a liquid, the micro bead is captured at a focal point of a focused infrared laser beam, and DNA, a biological molecule, a cell or the like is manipulated in the liquid via the micro bead. Further, the following patent literature 2 discloses a technique where a resin-made micro structural body having a total length of 10 μm prepared by a two-photon absorption stereolithography is used as an object, and a cell is manipulated or a force is measured by driving the object using optical tweezers in a liquid.

In such a technique which uses optical tweezers, an object (specimen) is extremely minute and hence, it is necessary to manipulate the object in a liquid while observing the object using a microscope. In such a case, the object which is to be manipulated using the optical tweezers can be observed only 2-dimensionally using a usual microscope and hence, there arises a drawback that it is difficult to grasp the vertical relationship between the object and a focal point of an optical trap so that an accurate manipulation cannot be performed.

On the other hand, as a microscope which enables the 3-dimensional observation of an object to be observed, conventionally, a confocal microscope has been used. In the confocal microscope, an excitation laser beam is focused and irradiated to a specimen (an object to be observed to which fluorescent staining is applied) through an objective lens, and a fluorescent light emitted from the specimen is made to pass through a pin hole arranged at a conjugated position with the objective lens and is imaged on a detector. Light emitted from regions other than a focal point of the objective lens is eliminated by the pin hole and hence, only light in a focal region can be detected. Then, by 2-dimensionally scanning a focal point of the excitation laser beam on the specimen using a pair of galvano mirrors and an acousto-optic modulator and hence, a thin cross-sectional image of the specimen in the vicinity of an area at a specified depth can be obtained. Further, by scanning the objective lens or a specimen stage in the direction of an optical axis, cross-sectional images at different depths can be obtained. Accordingly, a 3-dimensional image of the specimen can be formed.

Further, with respect to the above-mentioned confocal microscope, as disclosed in the following patent literatures 3, 4, for example, there has been known a method where, to accelerate 2-dimensional scanning on a specimen, an excitation laser beam is split into a plurality of laser beams using a nipkow disc or a microlens array, and a plurality of regions on the specimen are simultaneously scanned. To achieve the substantially same purpose, as disclosed in the following patent literature 5, for example, there may be a case where aline-scanning-type scanning system where an excitation laser beam is scanned by focusing the laser beam in a line shape is used.

(PTL 1) JP-A-H8-234110
(PTL 2) JP-A-2009-294008
(PTL 3) JP-A-2009-210889
(PTL 4) JP-A-2010-160371
(PTL 5) JP-A-2010-164635

DISCLOSURE OF THE INVENTION

As set forth above, by constituting the 3-dimensional confocal microscopy apparatus manufactured by combining a confocal microscope with an optical tweezers technique, a specimen can be observed 3-dimensionally using an optical tweezers technique. Accordingly, it is expected that the vertical relationship between the specimen and a focal point of an optical trap can be favorably grasped so that an accurate optical tweezers manipulation can be performed. However, an attempt to perform the 3-dimensional observation of the optically trapped specimen by combining the optical tweezers technique and the confocal microscope gives rise to a new drawback. This drawback is explained in conjunction with FIG. 1.

FIG. 1 shows an essential part of a 3-dimensional confocal microscopy apparatus manufactured by combining a confocal microscope with an optical tweezers technique in a simplified manner. In the drawing arranged on a left side of FIG. 1, a confocal imaging laser 1 passes through an objective lens 2, and forms a focal point on a focal plane 3. On the other hand, an optical tweezers laser 4 passes through the same objective lens 2 via a dichroic mirror 5, and captures a specimen 6 on the focal plane 3.

To perform the 3-dimensional observation of the specimen 6 in such a state, it is necessary to vertically scan the objective lens 2 in the confocal microscope. For example, when the objective lens 2 is moved to a lower position 7 as shown in the drawing arranged on a right side of FIG. 1, a focal plane 8 at a lower level can be observed. However, in such an operation, a focal point of the optical tweezers laser incident coaxially is also moved downward in an interlocking manner and hence, the specimen which is manipulated by the optical tweezers is also moved to a lower position 9 following the lowering of the focal point of the optical tweezers laser. That is, the conventional simple combination of the optical tweezers technique and the confocal microscope has a drawback that the 3-dimensional observation of the specimen without affecting the manipulation of the specimen using the optical tweezers cannot be realized.

Accordingly, it is an object of the present invention to overcome the above-mentioned drawback. To be more specific, it is an object of the present invention to provide a 3-dimensional confocal microscopy apparatus manufactured by combining a confocal microscope with an optical tweezers technique, wherein a 3-dimensional image of a specimen can be acquired without moving an objective lens and a focal point of an optical tweezers laser (specimen stage), in other words, without affecting an optical trap during the manipulation of the specimen using optical tweezers. It is another object of the present invention to ensure the accuracy of a 3-dimensional image of the specimen acquired in this manner.

(First Invention)

The first invention is directed to a 3-dimensional confocal microscopy apparatus including: a light source for a first laser for confocal imaging excitation; a 2-dimensional scanning optical system for scanning the first laser on a specimen; an objective lens for focusing the first laser supplied from the light source on a fluorescent specimen which is an object to be observed; and a fluorescent light imaging camera for detecting a fluorescent confocal microscopy image based on a fluorescent light emitted from the fluorescent specimen, wherein a pair of lenses for focal plane displacement is arranged between the objective lens and the fluorescent light imaging camera, the pair of lenses for focal plane displacement being constituted of an intermediate imaging lens which forms an intermediate image of the fluorescent confocal microscopy image of the specimen and an intermediate objective lens arranged such that a focal point of the intermediate objective lens overlaps with a focal point of the intermediate imaging lens on the same optical axis, and at least one lens out of these lenses being movable in an optical axis direction by a lens drive means, the 3-dimensional confocal microscopy apparatus further includes a computer having an arithmetic operation means for acquiring a 3-dimensional structural image of the specimen by correcting aberration of the fluorescent confocal microscopy image caused by the movement of the lens of the pair of lenses for focal plane displacement in real time using the fluorescent confocal microscopy image acquired by the fluorescent light imaging camera and aberration correction data which is acquired in advance by performing provisional measurement of a sample specimen, and a means which displays a corrected image obtained by the arithmetic operation means, and a beam splitter or a dichroic mirror is provided between the pair of lenses for focal plane displacement and the objective lens, and a second laser supplied from a light source for a second laser for optical tweezers passes through the objective lens via the beam splitter or the dichroic mirror and is focused on the specimen.

According to the first invention, in the 3-dimensional confocal microscopy apparatus manufactured by combining a confocal microscope with an optical tweezers technique, the pair of lenses for focal plane displacement is arranged between the objective lens and the fluorescent light imaging camera. By moving one lens of the pair of lenses for focal plane displacement in the optical axis direction by the lens drive means, as described later in detail in conjunction with FIG. 3, the focal plane can be displaced to planes at different heights in the specimen without moving the objective lens of the confocal microscope. Accordingly, even when the focal plane of the confocal microscope is displaced to planes at different heights in the specimen, a focal point of the optical tweezers laser (second laser) which is focused by the objective lens is not changed. Accordingly, the drawback that the present invention has can be overcome.

That is, in the 3-dimensional confocal microscopy apparatus manufactured by combining the optical tweezers technique and the confocal microscope, a 3-dimensional image of a specimen can be acquired without moving the objective lens and a focal point of the optical tweezers laser (specimen stage) (in other words, without affecting an optical trap during a manipulation of the specimen using the optical tweezers).

Although explained in detail later in conjunction with FIG. 3, by moving one lens of the pair of lenses for focal plane displacement in the optical axis direction by a lens drive means, a certain aberration is generated in a fluorescent confocal microscopy image in a microscope. However, such aberration is corrected in real time by an arithmetic operation means using the fluorescent confocal microscopy image and aberration correction data acquired in advance by performing the provisional measurement of a sample specimen and hence, an accurate 3-dimensional corrected image is displayed thus achieving the task of ensuring the accuracy of a 3-dimensional image of a specimen.

(Second Invention)

The second invention is, in the 3-dimensional confocal microscopy apparatus according to the first invention, characterized in that the 2-dimensional scanning optical system includes a nipkow disc or a line scanning type scanning system.

According to the second invention, by using the nipkow disc or the line scanning type scanning system in 2-dimensional scanning of a laser beam on a specimen, a confocal image of a cross section of the specimen at an arbitrary depth can be acquired at a high speed. Accordingly, it is possible to acquire a cross-sectional image with no wobbling even in the case of a specimen during movement using optical tweezers or a specimen having a motion.

(Third Invention)

The third invention is, in the 3-dimensional confocal microscopy apparatus according to the first invention or the second invention, characterized in that the lens drive means for the pair of lenses for focal plane displacement is one selected from a group consisting of a piezoelectric element, a magnetostrictive actuator and a voice coil.

According to the third invention, the lens drive means for the pair of lenses for focal plane displacement is a high-speed drive means such as a piezoelectric element, a magnetostrictive actuator or a voice coil and hence, a plurality of cross-sectional images at different depths in a specimen can be acquired at a high speed. Accordingly, in combination with a high-speed 2-dimensional scanning system of the second invention such as a nipkow disc or a line scanning-type scanning system, a 3-dimensional image of a specimen during the manipulation of the specimen using optical tweezers can be acquired at an extremely high speed.

(Fourth Invention)

The fourth invention is, in the 3-dimensional confocal microscopy apparatus according to any one of the first invention to the third invention, characterized in that timing for driving the lens drive means for the pair of lenses for focal plane displacement and timing for acquiring an image by a fluorescent imaging camera are adjusted so as to be synchronous with each other.

Further, as described in the fourth invention, by adjusting timing for driving the lens drive means for the pair of lenses for focal plane displacement and timing for acquiring an image by the fluorescent imaging camera so as to be synchronous with each other, timing at which the lens is stopped at a position where focusing is made at a specified depth of a specimen by driving a high speed scanning means and timing at which an image is imaged by a camera agree with each other and hence, a cross-sectional image of the specimen can be acquired without being affected by wobbling during high speed scanning.

(Fifth Invention)

The fifth invention is, in the 3-dimensional confocal microscopy apparatus according to any one of the first invention to the fourth invention, characterized in that an arithmetic operation using an arithmetic operation means for acquiring a 3-dimensional structural image of a specimen is performed by a GPU (Graphics Processing Unit).

According to the fifth invention, a 3-dimensional image of the specimen can be formed at a high speed based on a plurality of cross-sectional images of the specimen at different depths by an image arithmetic operation using the GPU and is displayed. Accordingly, during the manipulation of optical tweezers performed by an observer, a viewer can perform the manipulation while observing a 3-dimensional image of a specimen at a point of time from an arbitrary viewpoint with arbitrary magnification.

(Sixth Invention)

The sixth invention is, in the 3-dimensional confocal microscopy apparatus according to any one of the first invention to the fifth invention, characterized in that the 3-dimensional confocal microscopy apparatus further includes a beam splitter or a dichroic mirror which is arranged between the objective lens and the pair of lenses for focal plane displacement, and an imaging lens and a bright field imaging camera for imaging a 2-dimensional image of a specimen separated by the beam splitter or the dichroic mirror.

According to the sixth invention, a bright field image of a specimen which does not pass through the confocal optical system can be acquired by the bright field imaging camera different from the fluorescent light imaging camera. Accordingly, during the manipulation of the optical tweezers, a state of a non-luminescent portion of the specimen can be observed together with a 3-dimensional image of a fluorescent portion of the specimen.

(Seventh Invention)

The seventh invention is directed to a focal plane scanning and aberration correction unit to be incorporated into a 3-dimensional confocal microscopy apparatus comprises a pair of lenses for focal plane displacement, the pair of lenses for focal plane displacement being constituted of an intermediate imaging lens which forms an intermediate image of a fluorescent confocal microscopy image of a specimen and an intermediate objective lens arranged such that a focal point of the intermediate objective lens overlaps with a focal point of the intermediate imaging lens on the same optical axis, and at least one lens out of these lenses being movable in an optical axis direction by a lens drive means, and the focal plane scanning and aberration correction unit further comprises a computer having an arithmetic operation means for acquiring a 3-dimensional structural image of the specimen by correcting aberration of the fluorescent confocal microscopy image caused by the movement of the lens of the pair of lenses for focal plane displacement in real time using the fluorescent confocal microscopy image acquired by the fluorescent light imaging camera and aberration correction data which is acquired in advance by performing provisional measurement of a sample specimen, and a means which displays a corrected image obtained by the arithmetic operation means, wherein the 3-dimensional confocal microscopy apparatus comprises a light source for a laser; an objective lens for focusing the laser supplied from the light source on a fluorescent specimen; and a fluorescent light imaging camera for detecting a fluorescent confocal microscopy image based on a fluorescent light emitted from the fluorescent specimen, and wherein the focal plane scanning and aberration correction unit is to be arranged between the objective lens and the fluorescent light imaging camera.

According to the seventh invention, a novel focal plane scanning and aberration correction unit is provided. This unit constitutes a characterizing portion of the 3-dimensional confocal microscopy apparatus of the present invention. Further, for example, it may be also possible to provide a utilization method where the focal plane scanning and aberration unit is incorporated into an existing product of a general-type confocal microscope. Still further, it may be also possible to provide a utilization method where the focal plane scanning and aberration unit is incorporated into an existing product of a 3-dimensional confocal microscopy apparatus manufactured by combining a confocal microscope and an optical tweezers apparatus.

REFERENCE SIGNS LIST

Figure 1:
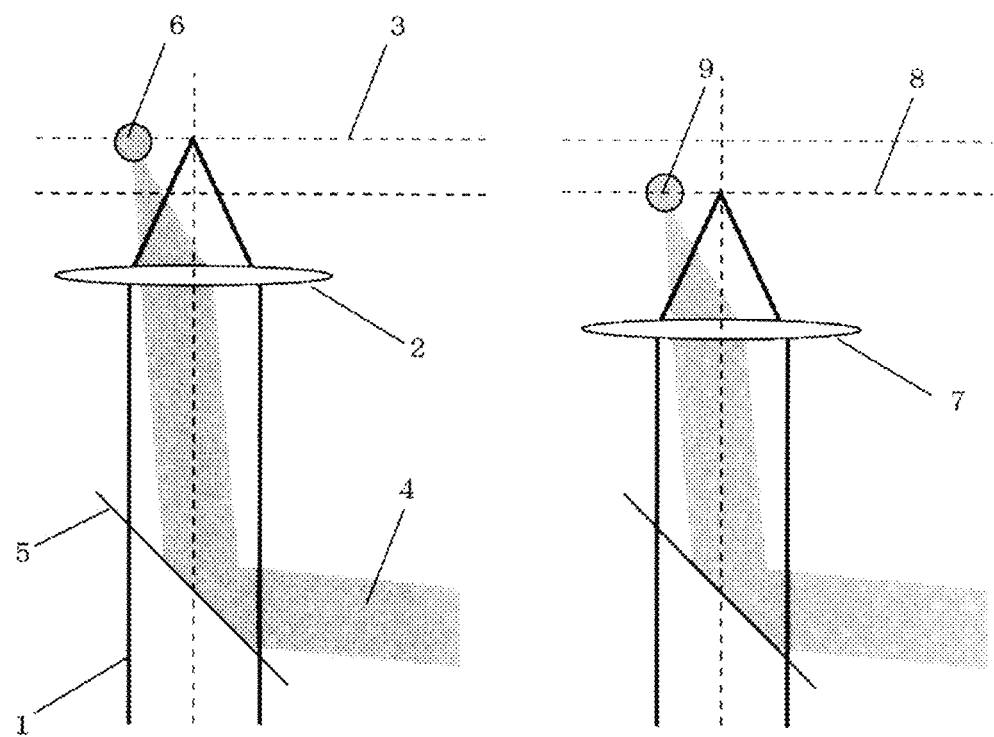
FIG. 1 shows a drawback which a 3-dimensional confocal microscopy apparatus manufactured by simply combining an optical tweezers technique and a confocal microscope has.

1: confocal imaging laser
2: objective lens
3: focal plane
4: optical tweezers laser
5: dichroic mirror
6: specimen 7: lower position
8: focal plane
9: lower position
10: excitation laser light source
11: confocal unit
12: objective lens
13: specimen
14: intermediate imaging lens
15: intermediate objective lens
16: confocal imaging camera
17: piezoelectric actuator
18: infrared laser light source
19: optical tweezers driving optical system
20: dichroic mirror
21: half mirror
22: bright field imaging camera
23: image processing process
24: cross-sectional image acquisition process
25: optical tweezers control process
26: columnar cross section
27: side surface
28: columnar cross section
29: side surface
30: body
31: fixed arm
32: movable arm
33: columnar projection portion
34: cell
35: minute structural body
36: movable arm
37: columnar projection portion
38: ring structure
39: cell which is object to be manipulated

DESCRIPTION OF EMBODIMENTS

Next, a mode for carrying out the present invention including the best mode for carrying out the present invention is explained.

[3-Dimensional Confocal Microscopy Apparatus]

A 3-dimensional confocal microscopy apparatus according to the present invention includes the following constitutions (1) to (4).

(1) A 3-dimensional confocal microscopy apparatus including: a light source for a first laser for confocal imaging excitation; a 2-dimensional scanning optical system for scanning the first laser on a specimen; an objective lens for focusing the first laser supplied from the light source on a fluorescent specimen which is an object to be observed; and a fluorescent light imaging camera for detecting a fluorescent confocal microscopy image based on a fluorescent light emitted from the fluorescent specimen, wherein (2) a pair of lenses for focal plane displacement is arranged between the objective lens and the fluorescent light imaging camera, the pair of lenses for focal plane displacement being constituted of an intermediate imaging lens which forms an intermediate image of the fluorescent confocal microscopy image of the specimen and an intermediate objective lens arranged such that a focal point of the intermediate objective lens overlaps with a focal point of the intermediate imaging lens on the same optical axis, and at least one lens out of these lenses being movable in an optical axis direction by a lens drive means, (3) the 3-dimensional confocal microscopy apparatus further includes a computer having an arithmetic operation means for acquiring a 3-dimensional structural image of the specimen by correcting aberration of the fluorescent confocal microscopy image caused by the movement of the lens of the pair of lenses for focal plane displacement in real time using the fluorescent confocal microscopy image acquired by the fluorescent light imaging camera and aberration correction data which is acquired in advance by performing provisional measurement of a sample specimen, and a means which displays a corrected image obtained by the arithmetic operation means, and (4) a beam splitter or a dichroic mirror is provided between the pair of lenses for focal plane displacement and the objective lens, and a second laser supplied from a light source for a second laser for optical tweezers passes through the objective lens via the beam splitter or the dichroic mirror and is focused on the specimen.

In the three-dimensional confocal microscopy apparatus having the above-mentioned constitution, the objective lens, the intermediate imaging lens and the intermediate objective lens which constitute a pair of lenses for focal plane displacement and, further, other various lenses described later in examples may be constituted from a single lens body, and may be constituted of a plurality of lens bodies which are arranged parallel to each other on the same optical axis and are accommodated in a cylindrical housing.

[First Constitutional Part of 3-dimensional Confocal Microscopy Apparatus]

In the above-mentioned constitution (1), "2-dimensional scanning optical system" is an optical system for acquiring a thin cross-sectional image of a specimen in the vicinity of a specific depth by 2-dimensionally scanning a focal point of excitation laser beams on the specimen, and known various two-dimensional scanning optical system can be used. However, particularly, a nipkow disc or a line-scanning-type scanning system can be preferably used.

The nipkow disc is, as is well known, a rotary disc on which a large number of pin holes are arranged in a vortex shape, for example, and can acquire a confocal image of a specimen with high-speed scanning performance by multi-beam scanning. However, the use of only such a rotary disc has drawbacks such as an insufficient optical amount or a so-called poor S/N ratio and hence, there has been also known a nipkow disc of an improved type where a micro lens array disc having a large number of micro lenses at positions corresponding to pin holes formed in a nipkow disc is formed into the integral structure with the nipkow disc, and both discs are synchronously rotated. Further, a dichroic mirror may be incorporated between the above-mentioned nipkow disc and micro lens array disc. The "nipkow disc" according to this invention includes all of discs of the above-mentioned types.

The line-scanning-type scanning system is disclosed in patent literature 5 or the like and is known. The line-scanning-type scanning system is a scanning optical system where an excitation laser beam is scanned in a focused manner in a line shape and, for example, an illumination light focused in a line shape is irradiated to a specimen, the illumination light in a line shape is scanned in the predetermined direction on the specimen, and light generated in an illuminated region on the specimen is detected by an optical detector thus acquiring 2-dimensional image data of the specimen.

The objective lens which focuses the first laser on the specimen which is an object to be observed is a fixed lens. However, a lens which is configured to be movable along an optical axis can achieve such an object when the lens is used without moving the lens at the time of using the lens and hence, such a lens can be also used as the objective lens of the present invention in this context.

[Second Constitutional Part of 3-dimensional Confocal Microscopy Apparatus]

In the above-mentioned constitution (2), an intermediate imaging lens and an intermediate objective lens which constitute the pairs of lenses for focal plane displacement are arranged such that a focal point of the intermediate imaging lens and a focal point of the intermediate objective lens overlap with each other on the same optical axis, and at least one lens is movable in the optical axis direction by the lens drive means. That is, either one of lenses is fixed and the other lens is made movable or both lenses are made movable. However, when both lenses are made movable, an accurate control of the drive means becomes difficult. Accordingly, it is preferable that either one of lenses is fixed and the other lens is made movable. It is more preferable that the fixed intermediate imaging lens is arranged on an objective lens sides, and the movable intermediate objective lens is arranged on a fluorescent imaging camera side.

Although a kind of the drive means which moves the lens is not limited, it is preferable to adopt a means capable of moving a lens at a high speed under an arcuate control. As such a drive means, for example, any one of a piezoelectric element, a magnetostrictive actuator and a voice coil which are well known is named.

Due to the reason set forth with respect to the fourth invention in the above-mentioned column "advantageous effects of the invention", it is preferable that timing of driving the lens drive means in the pair of lenses for focal plane displacement and timing of acquiring an image by the fluorescent imaging camera are adjusted so as to be synchronous with each other.

[Third Constitutional Part of 3-dimensional Confocal Microscopy Apparatus]

Figure 3:
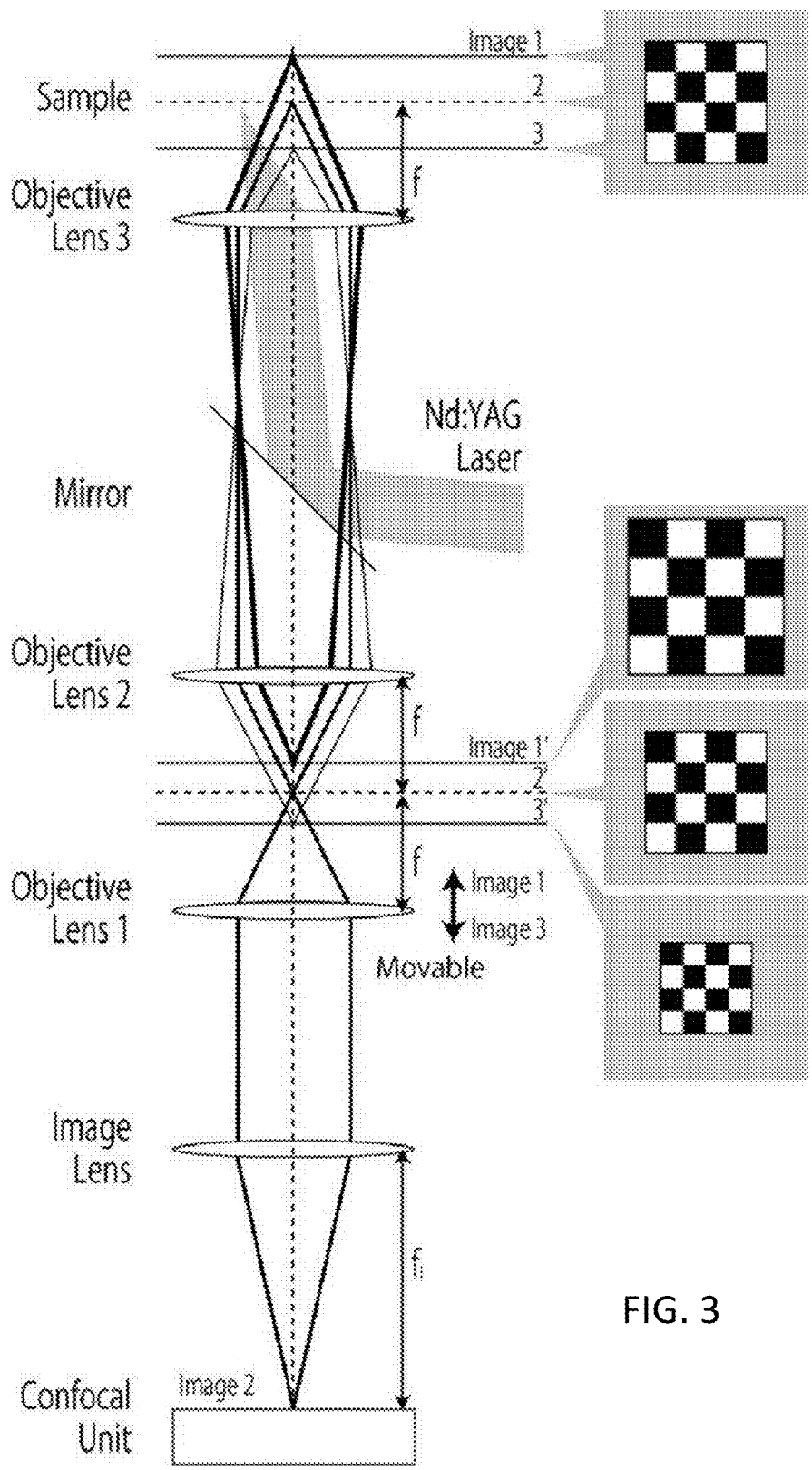
FIG. 3 explains the manner of operation and advantageous effects of a pair of lenses for focal plane displacement and the principle of aberration correction of a fluorescent confocal microscopy image brought about by such manner of operation and advantageous effects.

The meaning of "arithmetic operation for acquiring a 3-dimensional structural image of the specimen" in the above-mentioned constitution (3) is explained in conjunction with FIG. 3 by simplifying the basic constitution of the 3-dimensional confocal microscopy apparatus. In FIG. 3, an uppermost lens expressed as "Objective Lens 3" is a fixed objective lens for focusing a laser for confocal imaging excitation on the specimen, and lenses expressed as "Objective Lens 2" and "Objective Lens 1" arranged below "Objective Lens 3" are respectively the fixed intermediate imaging lens and the movable intermediate objective lens.

When the intermediate objective lens is at the position shown in FIG. 3, focal points of both lenses overlap with each other on a focal plane expressed as "Image 2'". In this case, a focal point of the objective lens (Objective Lens 3) agrees with a specimen stage expressed as "Sample". Accordingly, assuming that the specimen is a body having a checkerboard pattern in plane shown on a right side in FIG. 3, an imaged image having a usual size (Image 2) is transmitted to a fluorescent imaging part expressed as "Confocal Unit" on a lowermost side in FIG. 3.

On the other hand, when the intermediate objective lens is moved to the upper position expressed as "Image 1" and approaches the intermediate imaging lens, the focal points of both lenses overlap with each other on a focal plane expressed as "Image 1'" and hence, the focal point of the objective lens is shifted to an upper position beyond the specimen stage. Accordingly, the magnification of the lens is enlarged so that an enlarged imaged image which is the body having a checkerboard pattern is transmitted to the fluorescent light imaging part. To the contrary, when the intermediate objective lens is moved to a lower position expressed as "Image 3" so that the intermediate objective lens is moved away from the intermediate imaging lens, the focal points of both lenses overlap with each other on a focal plane expressed as "Image 3'" and hence, the focal point of the objective lens is shifted to a lower position which does not reach the specimen stage. Accordingly, a contracted imaged image of the body having a checkerboard pattern is transmitted to the fluorescent imaging part.

In this manner, when the intermediate objective lens is made to approach the intermediate imaging lens or to move away from the intermediate imaging lens to obtain a 3-dimensional structural image of the specimen, the deviation from designed focal lengths of both lenses is generated so that a fluorescent confocal microscopy image including aberration such as enlargement or contraction of the image is generated in the fluorescent imaging camera. Accordingly, it is necessary to acquire an accurate 3-dimensional structural image of the specimen by correcting such an aberration.

Accordingly, by performing the provisional measurement of a sample specimen such as the above-mentioned body having a checkerboard pattern, for example, the relationship of the degree of aberration such as enlargement or contraction of a fluorescent confocal microscopy image corresponding to a moving direction and a moving distance of the intermediate objective lens is acquired by a computer in advance as aberration correction data, and the aberration of the fluorescent confocal microscopy image based on the displacement of a focal plane in the pair of lenses for focal plane displacement is calculated and is corrected in real time thus accurately acquiring a 3-dimensional structural image of the specimen.

The above-mentioned calculation for acquiring the 3-dimensional structural image of the specimen can be preferably performed using a known GPU. The GPU is an auxiliary arithmetic operation unit or a dedicated circuit which is dedicated to 3-dimensional image processing in the computer.

[Fourth Constitutional Part of 3-dimensional Confocal Microscopy Apparatus]

The above-mentioned constitution (4) is provided for combining the optical tweezers technique with the confocal microscope. A second laser for optical tweezers is introduced onto an optical path between the pair of lenses for focal plane displacement and the objective lens in the confocal microscope via the beam splitter or the dichroic mirror and is focused on the specimen after passing through the objective lens.

The beam splitter is an optical part which reflects some of incident light and divides a light flux by allowing other portion of the incident light to pass therethrough. The optical part where the intensity of reflection light and the intensity of transmitting light are approximately 1:1 is referred to as a half mirror, and this half mirror is also included in the beam splitter. The dichroic mirror is an optical part which reflects light having a specified wave length and allows lights having other wave lengths to pass therethrough.

[Other Constitutional Part of 3-dimensional Confocal Microscopy Apparatus]

The 3-dimensional confocal microscopy apparatus can further include, besides the above-mentioned respective constitutional parts, a beam splitter or a dichroic mirror which is arranged between the objective lens and the pair of lenses for focal plane displacement, and an imaging lens and a bright field imaging camera for imaging a 2-dimensional image of the specimen separated by the beam splitter or a dichroic mirror.

[Focal Plane Scanning and Aberration Correction Unit]

The focal plane scanning and aberration correction unit according to the present invention is constituted of the above-mentioned second constitutional part and third constitutional part of the 3-dimensional confocal microscopy apparatus.

A representative usage of the focal plane scanning and aberration correction unit is a case where the focal plane scanning and aberration correction unit is incorporated into the 3-dimensional confocal microscopy apparatus manufactured by combining a confocal microscope with an optical tweezers technique. To be more specific, in the 3-dimensional confocal microscopy apparatus which includes the light source for a laser for confocal imaging excitation, the fixed objective lens which focuses the laser supplied from the light source on the fluorescent specimen, and the fluorescent imaging camera which detects a fluorescent confocal microscopy image based on fluorescent light emitted from the specimen, the focal plane scanning and aberration correction unit is arranged between the fixed objective lens and the fluorescent imaging camera.

EXAMPLES

Hereinafter, one example of the 3-dimensional confocal microscopy apparatus and the focal plane scanning and aberration correction unit according to the present invention is explained. The technical scope of the present invention is not limited by the following examples.

Example 1

Figure 2:
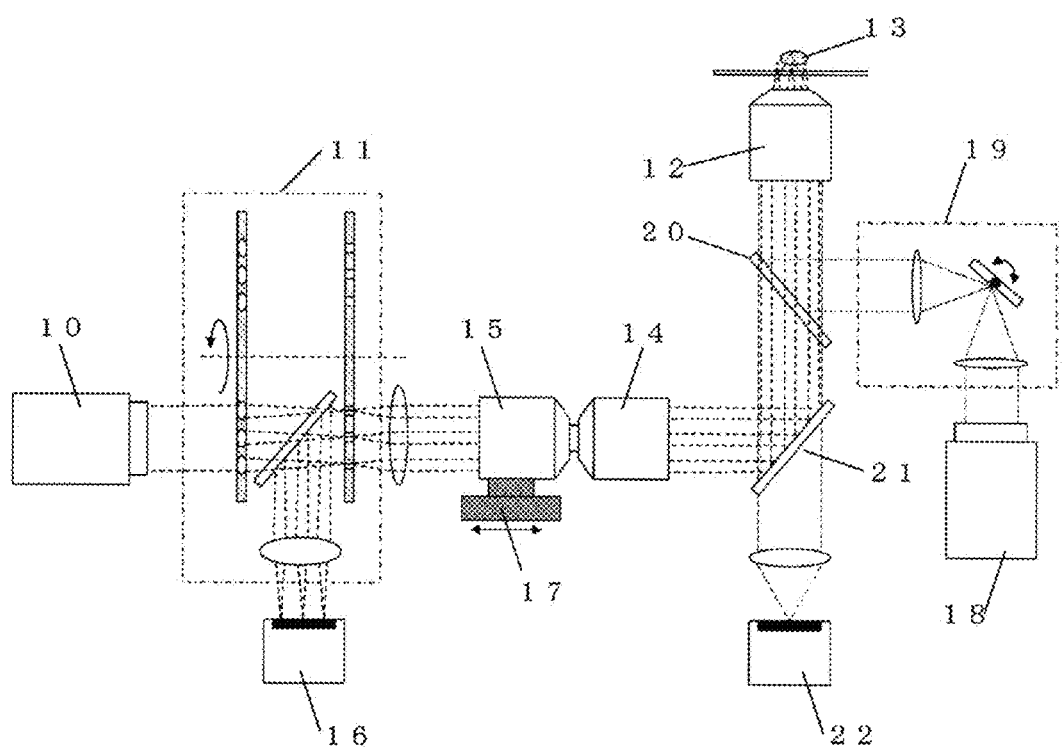
FIG. 2 shows an embodiment of the 3-dimensional confocal microscopy apparatus manufactured by combining the optical tweezers technique and the confocal microscope of the present invention.

Constitution, Manner of Operation and Advantageous Effects of 3-dimensional Confocal Microscopy Apparatus The constitution of the 3-dimensional confocal microscopy apparatus according to this example is shown in FIG. 2. In this 3-dimensional confocal microscopy apparatus, an excitation laser from an excitation laser light source 10 is divided and scanned through a confocal unit 11 of a nipkow disc type (CSU-X made by Yokogawa Electric Corporation), and is focused on a specimen 13 by an objective lens 12 (UPlanSApo100× made by Olympus).

The confocal unit 11 is of a type where a nipkow disc on a right side and a microlens array disc on a left side both shown in the cross-sectional view are formed into the integral structure, and both discs are synchronously rotated. A dichroic mirror is incorporated between the nipkow disc and the microlens array disc. Further, an imaging lens is provided below the dichroic mirror in the drawing.

A fluorescent light emitted from the specimen 13 by the excitation laser passes through a pair of lenses for focal plane displacement (UPlanSApo100× made by Olympus) which is arranged behind the objective lens 12 and is constituted of a fixed intermediate imaging lens 14 and a movable intermediate objective lens 15 which is arranged such that a focal point of the intermediate imaging lens 14 and a focal point of the intermediate objective lens 15 overlap with each other on the same optical axis, and is focused on a confocal imaging camera 16 (ImagEM: EMCCD camera made by Hamamatsu Photonics) which is a high sensitive fluorescent light imaging camera for detecting a fluorescent confocal microscopy image by an imaging lens of the confocal unit 11.

A piezoelectric actuator 17 (P-721 made by PI-Japan Corporation) is mounted on the intermediate objective lens 15. By driving the intermediate objective lens 15 in the optical axis direction with the actuation of the piezoelectric actuator 17, it is possible to displace an imaging focal plane in the vertical direction on the drawing without moving the objective lens 12 of the confocal microscope. The driving of the piezoelectric actuator 17 is performed at a high speed that approximately 30 slices of cross-sectional images can be acquired within 1 second at intervals of 1 µm of the specimen.

An infrared laser irradiated from an infrared laser light source 18 for optical tweezers passes through a pair of scanning mirrors of an optical tweezers driving optical system 19, and is focused on the specimen 13 by a dichroic mirror 20 arranged below the objective lens 12.

Further, a half mirror 21 is arranged below the objective lens 12 and, using this half mirror 21, a non-fluorescent image of the specimen 13 is focused on a bright field imaging camera 22 via the imaging lens thus enabling the observation of a bright field image.

Figure 4:
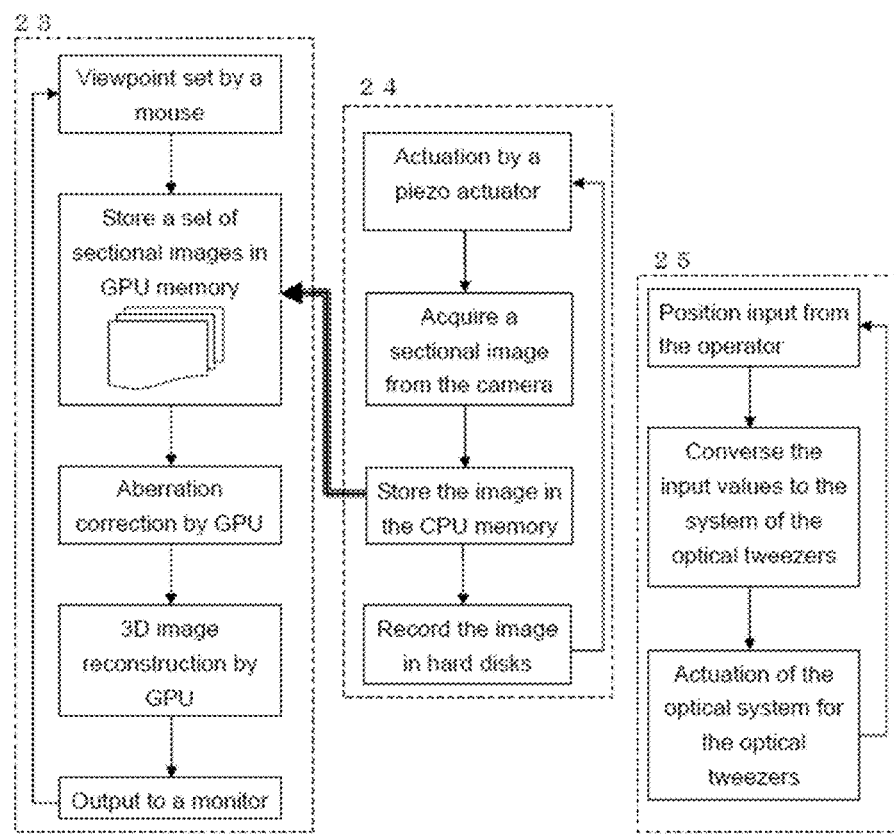
FIG. 4 shows a flowchart of a 3-dimensional confocal microscopy and manipulation process according to the present invention.

Next, the flow of a process for processing data or the like in this embodiment is explained in conjunction with FIG. 4. The process is mainly constituted of three processes, that is, an image processing process 23, a cross-sectional image acquisition process 24, and an optical tweezers control process 25.

In the image processing process 23, firstly, an observation view point is instructed when an operator manipulates a mouse on a screen. A set of cross-sectional views of the specimen 13 which is sequentially transferred from the cross-sectional image acquisition process 24 and is updated is stored in a memory of a GPU (GTX295 made by NVIDIA) of a computer, pre-calibrated aberration correction calculation is applied to the respective cross-sectional images and, thereafter, a 3-dimensional image is formed from an observation viewpoint instructed by volume rendering, and is displayed on a screen which constitutes a means for displaying a corrected image. A 3-dimensional image formed of 512×512×512 pixels can be displayed at a frame rate of 30 frames per second.

In the cross-sectional image acquisition process 24, firstly, the intermediate objective lens 15 is moved to a predetermined position by driving the piezoelectric actuator 17 and, thereafter, a confocal image of the focal plane is acquired by the confocal imaging camera 16, and is stored in the main memory. The confocal image is readily transferred to the set of cross-sectional images on the GPU memory in the image processing process 23. In this example, since the frame rate of the confocal imaging camera 16 is 30 frames per second, when the specimen 13 is observed in cross sections at 10 layers, for example, a 3-dimensional image of the specimen 13 is, as a whole, updated 3 times for every second. Further, the confocal image in the main memory is recorded in a hard disc together with focal depth information and acquisition time information, and can be used for an analysis after an experiment is finished.

In the optical tweezers control process 25, firstly, a position of the optical tweezers is instructed by a manipulator using a 3-dimensional mouse on a screen, a scanning amount of the optical tweezers driving optical system 19 is calculated based on the instruction, and a focal point of the optical tweezers is moved.

Through the above-mentioned three processes, by freely manipulating an optical driving nano machine in a 3-dimensional space, positions and the deformation of the machine and an object to be manipulated can be 3-dimensionally observed in real time from an arbitrary direction.

Example 2

Use of 3-dimensional Confocal Microscopy Apparatus

Figure 5:
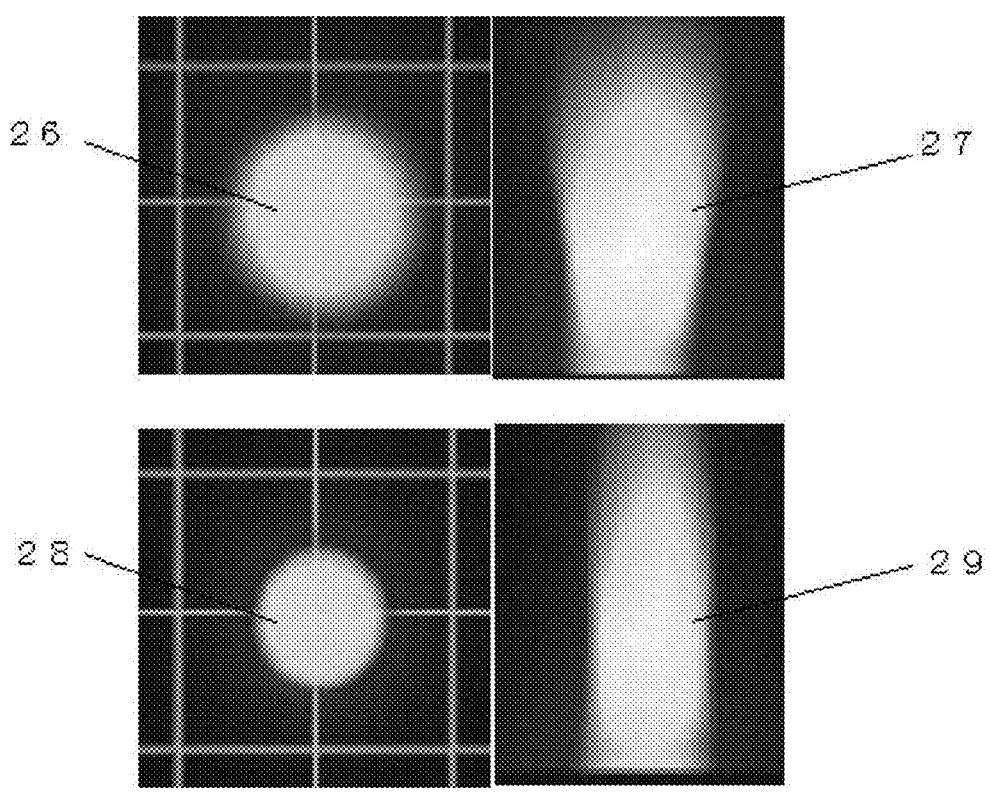
FIG. 5 shows a confocal imaged image of a specimen (fluorescent columnar structural body) of this embodiment before aberration correction (drawing on an upper side) and after aberration correction (drawing on a lower side).

FIG. 5 shows a mode where a fluorescent columnar structural body having a diameter of 3 µm is subjected to the confocal observation using the 3-dimensional confocal microscopy apparatus of the example 1. When the above-mentioned aberration correction is not performed, the magnification of the lens is increased corresponding to the movement of a focal plane upward from a bottom surface of a specimen and hence, a columnar cross section 26 of the specimen becomes larger than an actual size so that a side surface 27 of the columnar structural body also appears in an inverse trapezoidal shape. However, when the real time correction is performed using the GPU, both a columnar cross section 28 and a side surface 29 of the columnar structural body can acquire a three dimensional image of an actual size.

Figure 6:
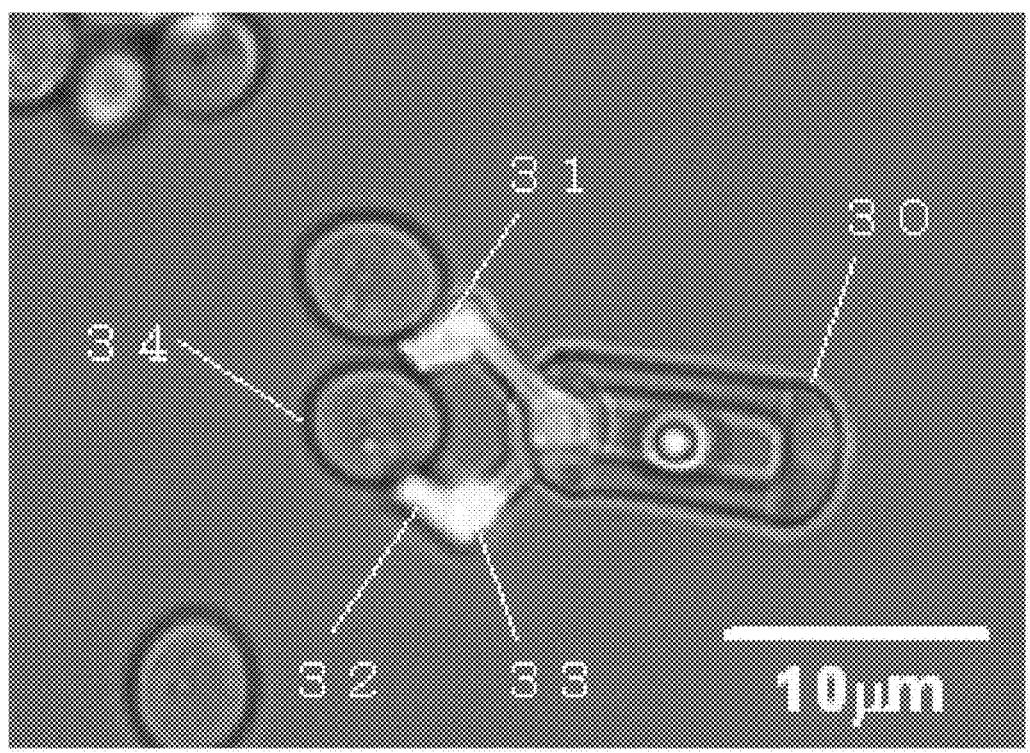
FIG. 6 shows a bright field imaged image of a resin-made minute structural body for cell manipulation having a total length of 10 µm which is prepared by a two-photon absorption stereolithography.
Figure 7:
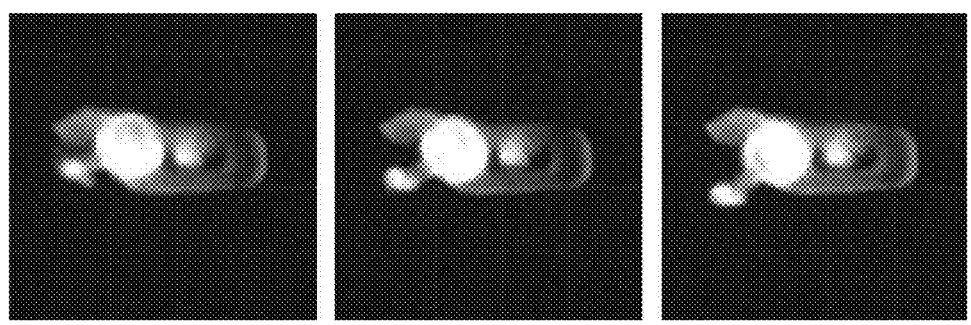
FIG. 7 shows a mode where a columnar projection portion which is a minute structural body is captured by optical tweezers in a liquid and a movable arm is driven using the 3-dimensional confocal microscopy apparatus of the present invention.

Next, the driving of a minute structural body prepared by a two-photon absorption stereolithography and a manipulation of a cell are performed using the 3-dimensional confocal microscopy apparatus of the example 1. FIG. 6 is a 2-dimensional image of the minute structural body imaged by the bright field imaging camera 22. The structural body is constituted of a body 30, a fixed arm 31, a movable arm 32 which is operable to approach the fixed arm 31 or is movable away from the fixed arm 31, and a columnar projection portion 33 for capturing the movable arm 32 by optical tweezers. By capturing the body 30 and the columnar projection portion 33 by the optical tweezers and by driving the movable arm 32, a cell 34 can be manipulated. A mode where the movable arm 32 is driven by the optical tweezers is shown in sequence photographs shown in FIG. 7.

Figure 8:
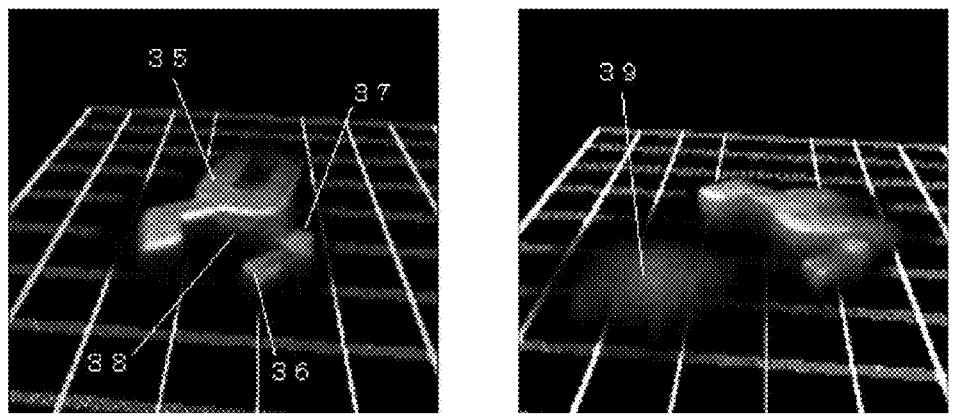
FIG. 8 shows a mode where a cell is manipulated while the cell and an operation of a micro structural body are observed in real time 3-dimensionally using the 3-dimensional confocal microscopy apparatus according to the present invention.

Further, FIG. 8 shows a 3-dimensional image where a minute structural body 35 and a columnar projection portion 37 having a diameter of 1 µm formed on a movable arm 36 are captured by optical tweezers, and an attempt is made to grasp a cell 39 while driving the movable arm 36. The columnar projection portion 37 and the ring structure 38 of a mounting portion of the movable arm 36 are clearly observed so that it is safe to say that the resolution of sub micro order is obtained.

A specimen can be observed only in plane in the case of the conventional system and hence, it is difficult to grasp the vertical positional relationship between a cell and a minute structural body driven by optical tweezers so that the manipulation requires skills. By using the 3-dimensional confocal microscopy apparatus of the present invention, the 3-dimensional positional relationship between a minute structural body and a cell can be grasped at a glance so that the manipulability of the 3-dimensional confocal microscopy apparatus is greatly enhanced. In this manner, with the use of the 3-dimensional confocal microscopy apparatus of the present invention, the 3-dimensional confocal observation can be realized at an arbitrary view point simultaneously with the manipulation of an object to be observed such as a cell by driving a minute structural body using optical tweezers.

INDUSTRIAL APPLICABILITY

According to the present invention, a 3-dimensional image of a specimen can be acquired during the manipulation of the specimen using optical tweezers without affecting an optical trap. Further, the accuracy of the 3-dimensional image of the specimen acquired in this manner can be also ensured.

The invention claimed is:

1. A 3-dimensional confocal microscopy apparatus, comprising:
a first laser for confocal imaging excitation; a 2-dimensional scanning optical system for scanning the first laser on a specimen; an objective lens for focusing the first laser on a fluorescent specimen; a camera for detecting a fluorescent confocal microscopy image based on fluorescent light emitted from the fluorescent specimen, and a computer for outputting a 3-dimensional structural image of the specimen, wherein:
a pair of lenses for focal plane displacement is arranged between the objective lens and the camera, wherein one lens of the pair of lenses for focal plane displacement is an intermediate imaging lens which forms an intermediate image of the fluorescent confocal microscopy image of the specimen and another lens of the pair of lenses for focal plane displacement is an intermediate objective lens arranged in proximity to the intermediate imaging lens such that a focal point of the intermediate objective lens overlaps with a focal point of the intermediate imaging lens on the same optical axis, and at least one of the intermediate imaging lens and the intermediate objective lens being movable along an optical axis by a lens drive means, and
an optical component is arranged between the pair of lenses for focal plane displacement and the objective lens, and the optical component changes the optical axis of the first laser from the pair of lenses for focal plane displacement and a second laser for optical tweezers which passes through the objective lens and is focused on the specimen,
wherein there are no lenses between the objective lens and the specimen, and
the computer has a processor configured to:
calculate aberrations of the fluorescent confocal microscopy images detected by the camera, based on the relationship between degree of aberration of images and displacement of a focal plane, wherein positions of the focal plane are changed when at least one of the intermediate imaging lens and the intermediate objective lens moves,
correct the detected fluorescent confocal microscopy images using the calculated aberrations,
generate the 3-dimensional structural image from the corrected fluorescent confocal microscopy images, and
output the 3-dimensional structural image of the specimen.

2. The 3-dimensional confocal microscopy apparatus according to claim 1, wherein the 2-dimensional scanning optical system comprises a line-scanning type scanning system.

3. The 3-dimensional confocal microscopy apparatus according to claim 1, wherein the 2-dimensional scanning optical system comprises a nipkow disk.

4. The 3-dimensional confocal microscopy apparatus according to claim 1, wherein the lens drive means for the pair of lenses for focal plane displacement comprises a piezoelectric element.

5. The 3-dimensional confocal microscopy apparatus according to claim 1, wherein the lens drive means comprises a magnetostrictive actuator.

6. The 3-dimensional confocal microscopy apparatus according to claim 1, wherein the lens drive means for the pair of lenses comprises a voice coil.

7. The 3-dimensional confocal microscopy apparatus according to claim 1, wherein the timing for driving the lens drive means for the pair of lenses and the timing for acquiring an image by a fluorescent imaging camera are adjusted so as to be synchronous with each other.

8. The 3-dimensional confocal microscopy apparatus according to claim 1, wherein:

the processor comprises a graphics processing unit.

9. The 3-dimensional confocal microscopy apparatus according to claim 1, further comprising an imaging lens and a bright field imaging camera for imaging a 2-dimensional image of a specimen separated by the optical component.

10. A focal plane scanning and aberration correction unit to be incorporated into a 3-dimensional confocal microscopy apparatus, comprising:

a pair of lenses for focal plane displacement, wherein one lens of the pair of lenses is an intermediate imaging lens which forms an intermediate image of a fluorescent confocal microscopy image of a specimen and another lens of the pair of lenses for focal plane displacement is an intermediate objective lens arranged in proximity to the intermediate imaging lens such that a focal point of the intermediate objective lens overlaps with a focal point of the intermediate imaging lens on the same optical axis, at least one of the intermediate imaging lens and the intermediate objective lens being movable along an optical axis by a lens drive means;

a computer for outputting a 3-dimensional structural image of the specimen; and a display which displays the 3-dimensional structural image;

wherein:

the 3-dimensional confocal microscopy apparatus comprises a first laser; an objective lens for focusing the laser on a fluorescent specimen; and a camera for detecting a fluorescent confocal microscopy image based on fluorescent light emitted from the fluorescent specimen;

the focal plane scanning and aberration correction unit is arranged between the objective lens and the camera; and an optical component is arranged between the pair of lenses for focal plane displacement and the objective lens, and the optical component changes the optical axis of the first laser from the pair of lenses for focal plane displacement and a second laser for optical tweezers which passes through the objective lens and is focused on the fluorescent specimen, wherein there are no lenses between the objective lens and the specimen, and the computer has a processor configured to:

calculate aberrations of the fluorescent confocal microscopy images detected by the camera, based on the relationship between degree of aberration of images and displacement of a focal plane, wherein positions of the focal plane are changed when at least one of the intermediate imaging lens and the intermediate objective lens moves, correct the detected fluorescent confocal microscopy images using the calculated aberrations, generate the 3-dimensional structural image from the corrected fluorescent confocal microscopy images, and output the 3-dimensional structural image of the specimen.

* * * * *